United States Patent
Yim et al.

(10) Patent No.: US 8,239,838 B2
(45) Date of Patent: Aug. 7, 2012

(54) KERNEL-AWARE DEBUGGING SYSTEM, MEDIUM, AND METHOD

(75) Inventors: Keun-soo Yim, Yongin-si (KR);
Jung-keun Park, Seoul (KR);
Jeong-joon Yoo, Yongin-si (KR);
Jae-don Lee, Palu-si (KR); Chae-seok Im, Suwon-si (KR); Young-sam Shin, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1415 days.

(21) Appl. No.: 11/797,759

(22) Filed: May 7, 2007

(65) Prior Publication Data
US 2007/0266376 A1    Nov. 15, 2007

(30) Foreign Application Priority Data

May 11, 2006    (KR) .................. 10-2006-0042388

(51) Int. Cl.
*G06F 9/44* (2006.01)
(52) U.S. Cl. ............... 717/129; 717/124; 717/127
(58) Field of Classification Search ............ None
See application file for complete search history.

(56) References Cited

U.S. PATENT DOCUMENTS

| | | | |
|---|---|---|---|
| 5,179,702 A * | 1/1993 | Spix et al. .................... 718/102 |
| 5,889,988 A | 3/1999 | Held | |
| 6,480,818 B1 | 11/2002 | Alverson et al. | |
| 6,493,868 B1 | 12/2002 | DaSilva et al. | |
| 6,782,424 B2 | 8/2004 | Yodaiken | |
| 6,795,966 B1 | 9/2004 | Lim et al. | |
| 6,804,813 B1 | 10/2004 | Willems et al. | |
| 6,848,097 B1 * | 1/2005 | Alverson et al. .............. 717/124 |
| 7,865,883 B1 * | 1/2011 | Sistare et al. .................. 717/129 |
| 2002/0056047 A1 * | 5/2002 | Lehman .................... 713/200 |
| 2003/0233634 A1 | 12/2003 | Carrez et al. | |

(Continued)

FOREIGN PATENT DOCUMENTS

JP    11-306032    5/1999

(Continued)

OTHER PUBLICATIONS

P. Tullmann, J. Lepreau, B. Ford, and M. Hibler. User-level Checkpointing Through Exportable Kernel State. In Proc. Fifth International Workshop on Object Orientation in Operating Systems, Seattle, WA, Oct. 1996. IEEE.*

(Continued)

*Primary Examiner* — Wei Zhen
*Assistant Examiner* — Matthew Brophy
(74) *Attorney, Agent, or Firm* — Staas & Halsey LLP

(57) ABSTRACT

A kernel-aware debugging system, medium, and method. The kernel-aware debugging system may include a kernel-aware debugging interface including a conditional breakpoint setting unit which sets a kernel-aware conditional breakpoint by checking a currently operating object inside a kernel of a target system when a central processing unit (CPU) of the target system stops operating at a particular position where the breakpoint is set and making the CPU proceed to operate when it is determined that it is not intended that the currently operating object be debugged. Moreover, the kernel-aware debugging interface may include a unit which stores control flow information for detecting faults due to asynchronous events, a profiling unit which collects profile information and allows back-tracing when faults occur, and a unit which debugs a synchronization problem between multitasks.

38 Claims, 12 Drawing Sheets

U.S. PATENT DOCUMENTS

2005/0229163 A1* 10/2005 Bates et al. .................. 717/129
2006/0026564 A1* 2/2006 Cabillic ....................... 717/118

FOREIGN PATENT DOCUMENTS

| KR | 10-2003-0068571 | 8/2003 |
|---|---|---|
| WO | 01/44942 | 6/2001 |

OTHER PUBLICATIONS

T. Akgul, P. Kuacharoen, V. J. Mooney, and V. K. Madisetti. A Debugger RTOS for Embed-ded Systems. In Euromicro Conference, 2001. Proceedings, pp. 264-269, 2001.*

Shulz D. et al., "A Thread-Aware Debugger With an Open Interface", Software Engineering Notes, ACM, New York, NY, US, vol. 25, No. 5, Aug. 21, 2000, pp. 201-211.

Thane H. et al., "Replay Debugging of Real-Time Systems Using Time Machines", Parallel and Distributed Processing Symposium, 2003. Proceedings. International Apr. 22-26, 2003, Piscataway, NJ, USA, IEEE, Apr. 22, 2003, pp. 288-295.

European Search Report issued in by the European Patent Office on Apr. 8, 2010 corresponds to European Patent Application 07107671.5-1225.

* cited by examiner

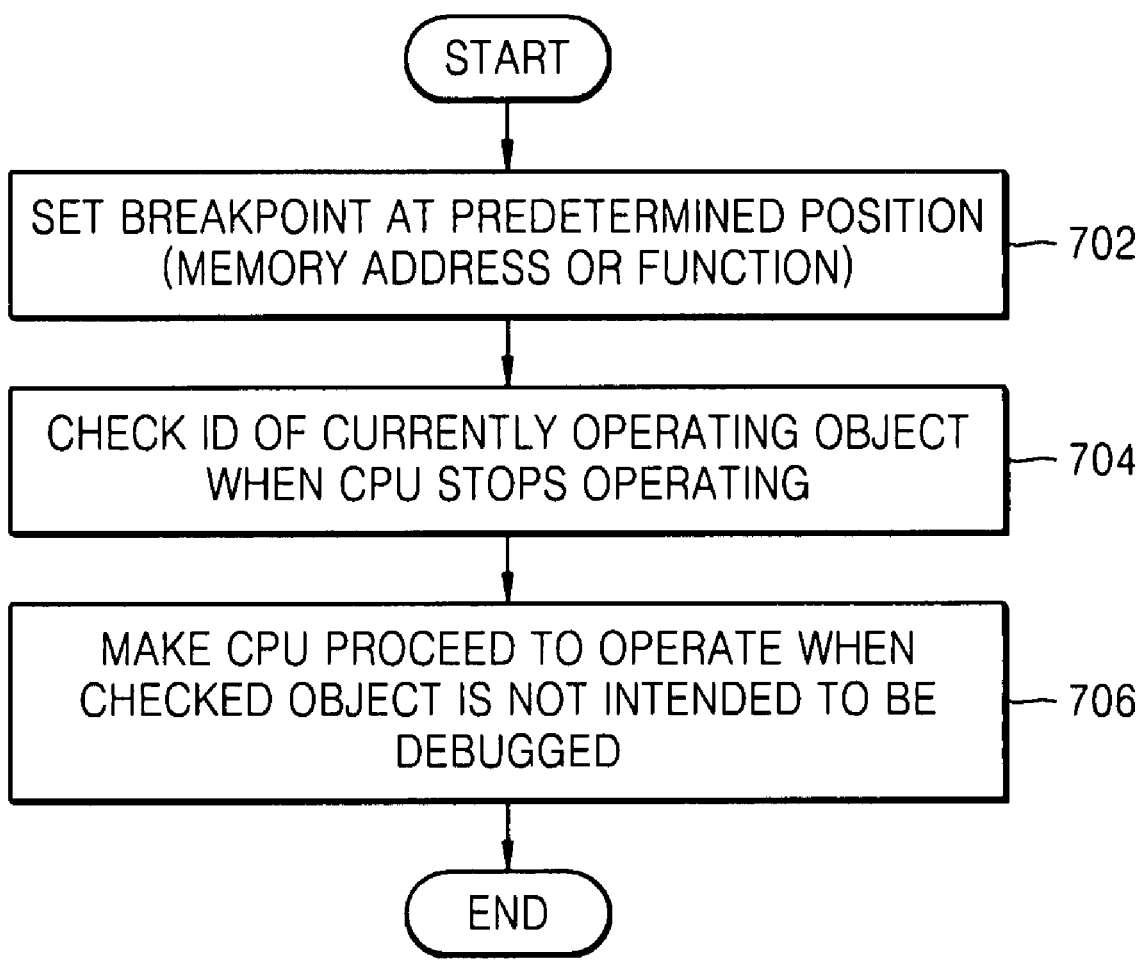

KERNEL-AWARE DEBUGGING SYSTEM, MEDIUM, AND METHOD

CROSS-REFERENCE TO RELATED APPLICATIONS

This application claims the priority of Korean Patent Application No. 10-2006-0042388, filed on May 11, 2006 in the Korean Intellectual Property Office, the disclosure of which is incorporated herein in its entirety by reference.

BACKGROUND OF THE INVENTION

1. Field of the Invention

One or more embodiments of the present invention relate to debugging of built-in software, and more particularly, to a system, medium, and method of kernel-aware debugging which allow efficient debugging for developing an operating system or software which operates prior to the operating system.

2. Description of the Related Art

A debugger refers to a program or hardware which identifies or shows a state, e.g., values of a register and/or a memory, related to software being debugged, and can be used to control the performance of the software, e.g., in response to a user's input, to detect faults within the software or evaluate the performance thereof. Debuggers of built-in software can be categorized into software debuggers and hardware debuggers. The software debugger is mainly used to debug application programs and is developed using functions, such as ptrace or proc file system, provided by the kernel. In comparison, the hardware debugger is based on functions, such as JTAG (joint test action group) interface, provided by hardware and debugs mainly embedded software.

FIG. 1 illustrates architecture of an agent based software debugger. The architecture includes of a host system 110 acting as the debugger and a target system 120 including middleware 122 and/or application 124 software, which are to be debugged by the debugger. Here, the host system 110 and target system 120, having an OS kernel 126 the middleware 122 and application 124 software, communicate with one another.

Referring to FIG. 1, the software debugger may be implemented by adding a debugging agent module 128 to a target system 120, as a part of the kernel 126 or an application program. The host system 110 may control the debugging agent module 128 to perform a simple debugging command through a real time operating system (RTOS) kernel-aware debugging interface 114. The command to be performed by the debugging agent module 128 may be a command for setting or releasing a breakpoint, a command for reading or writing the value of a memory, or the like. The RTOS kernel-aware debugging interface 114 may allow the debugging agent module 128 to stop a central processing unit (CPU) of the target system 120 at a specific point and read a desired value of a memory address and store it in a trace storage unit 130 by combining the basic commands. The simple command to be performed by the debugging agent module 128 is transmitted to the debugging agent module 128 through a debugging agent interface module 118 of the host system 110, with the debugging agent interface module 118 creating the command with reference to a symbol information table 116 and receiving trace information collected by the debugging agent module 128. The debugging agent interface module 118 is under the control of a debugging interface module 114, which is superior to the debugging agent interface module 118. The debugging interface module 114, if necessary, collects and analyzes information about various operating system components and then outputs the information through a user interface 112, for example, while being aware of the architecture of the operating system being debugged.

The advantage of this technique is that it is thereby possible to debug the embedded software without a hardware debugging device. Moreover, it is possible to debug the detailed elements of the operating system independently. However, such a technique that performs debugging indirectly by transmitting the command to the debugging agent module 128 leads to more overhead in terms of performance, compared with other techniques, such as a hardware debugger, resulting in it being difficult to perform an advanced debugging function properly. Therefore, if use of a hardware debugger is possible, it is typically better to perform hardware based debugging according to the hardware debugging architecture illustrated in FIG. 2.

FIG. 2 illustrates architecture of a JTAG based hardware debugger, which utilizes a JTAG or boundary scan interface, which is one type of hardware debugging.

Referring to FIG. 2, like the above target system 120, a target system 230 includes middleware 232, an application 234, and an OS kernel 236. However, a difference between the two target systems is that a hardware JTAG module 238 acts as the debugging agent module 128. The hardware JTAG module 238 directly controls pins of the CPU of a target system 230 so that it can set a breakpoint and perform memory input/output quickly by way of hardware. Like the above host system 110, a host system 210 also may include a user interface 212, an RTOS kernel-aware debugging interface 214 and a symbol information table 216, while further controlling the JTAG module 238 of the target system 230 through a JTAG debugger interface 218. The JTAG debugger interface 218 may collect trace information, utilizing symbol information 216, and store the trace information in a trace storage unit 220, for example.

This conventional hardware debugging architecture provides capabilities for stopping and resuming the CPU, and accessing the input/output register and memory. In addition, such conventional kernel-aware debugging includes awareness of the data structure of the kernel and may, for example, provide a user with information such as the state of tasks or mutual exclusion (mutex) through a user interface.

However, such a conventional hardware debugging technique cannot provide advanced debugging capabilities such as a debugging capability for securing stability, which is valued in the course of software development, such as a debugging of temporarily occurring transient faults. The temporary faults can be caused by an asynchronous control flow, such as interrupt, and synchronizing and communication between tasks. However, since these events do not occur frequently, when the faults do occur, it is difficult to establish their causes and represent them if no appropriate debugging method is provided. Because the operating system and software are large and stability is important, debugging of the temporary faults is a very important requirement with regard to commercializing the operating system and software.

SUMMARY OF THE INVENTION

One or more embodiments of the present invention provide an efficient debugging capability by expanding an operating system.

One or more embodiments of the present invention also provide an advanced debugging capability for efficiently detecting a cause of a temporary fault.

Additional aspects and/or advantages of the invention will be set forth in part in the description which follows and, in part, will be apparent from the description, or may be learned by practice of the invention.

To achieve the above and/or other aspects and advantages, embodiments of the present invention include a kernel-aware debugging system, including a kernel-aware debugging interface including a conditional breakpoint setting unit which sets a kernel-aware conditional breakpoint by checking a currently operating object inside a kernel of a target system when a central processing unit (CPU) of the target system stops operating at a particular position where the breakpoint is set and making the CPU proceed to operate when it is determined that the currently operating object is predetermined as being not intended to be debugged.

To achieve the above and/or other aspects and advantages, embodiments of the present invention include a debugging method, the method including setting a kernel-aware conditional breakpoint by checking a currently operating object inside a kernel of a target system when a central processing unit (CPU) of the target system stops operating at a position where the breakpoint has been set and making the CPU proceed to operate if the checked object is predetermined as being not intended to be debugged.

To achieve the above and/or other aspects and advantages, embodiments of the present invention include at least one medium including computer readable code to control at least one processing element to implement one or more embodiments of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 7A is illustrates a method of setting a kernel-aware conditional breakpoint, according to an embodiment of the present invention;

DETAILED DESCRIPTION OF THE PREFERRED EMBODIMENTS

Figure 1:
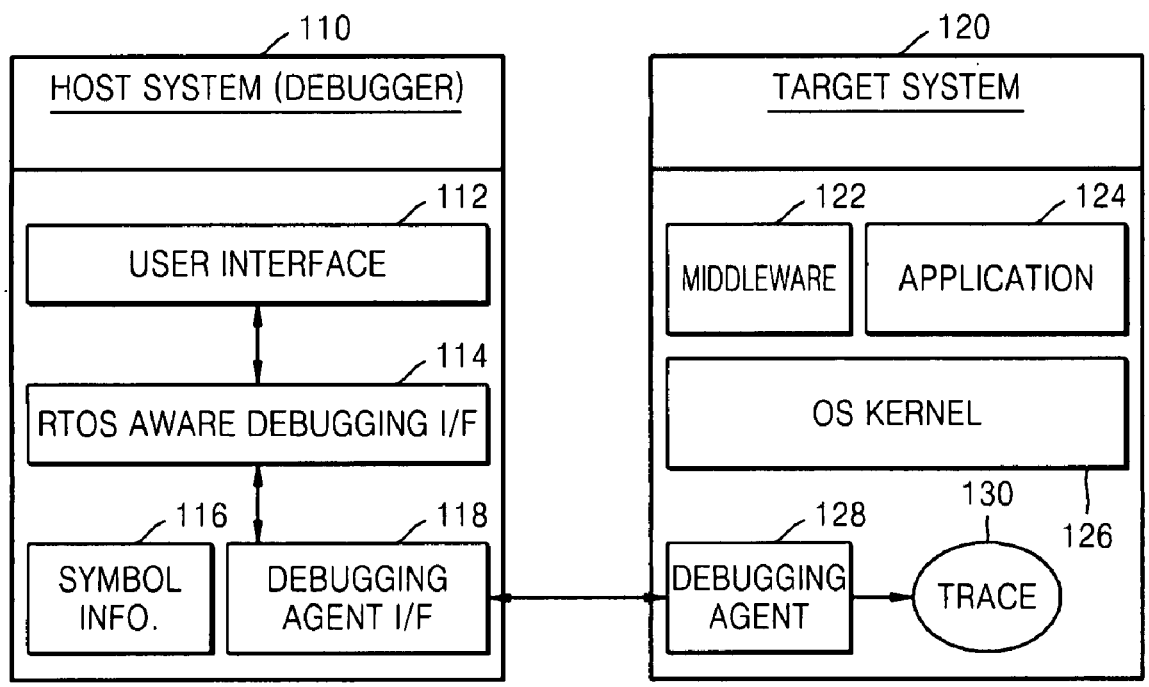
FIG. 1 illustrates architecture of an agent based software debugger.
Figure 2:
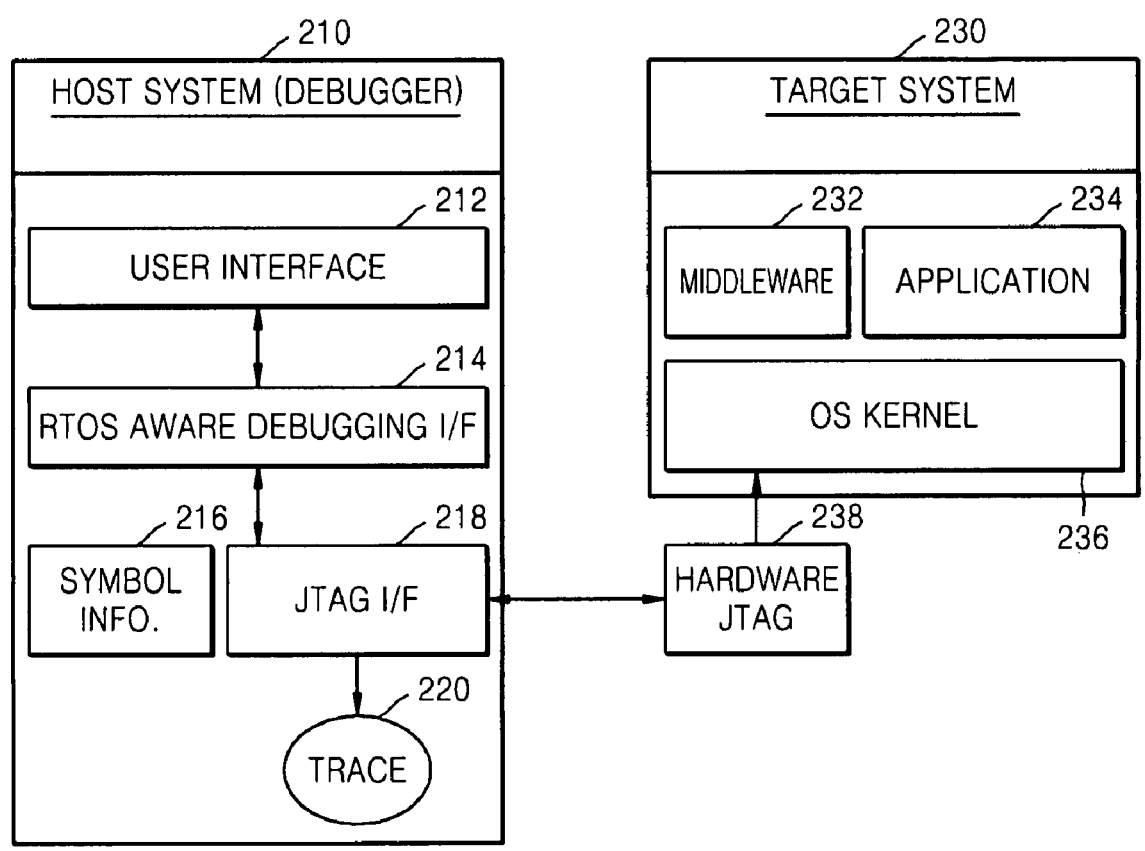
FIG. 2 illustrates architecture of a JTAG based hardware debugger.

Reference will now be made in detail to embodiments of the present invention, examples of which are illustrated in the accompanying drawings, wherein like reference numerals refer to the like elements throughout. Embodiments are described below to explain the present invention by referring to the figures.

Figure 3:
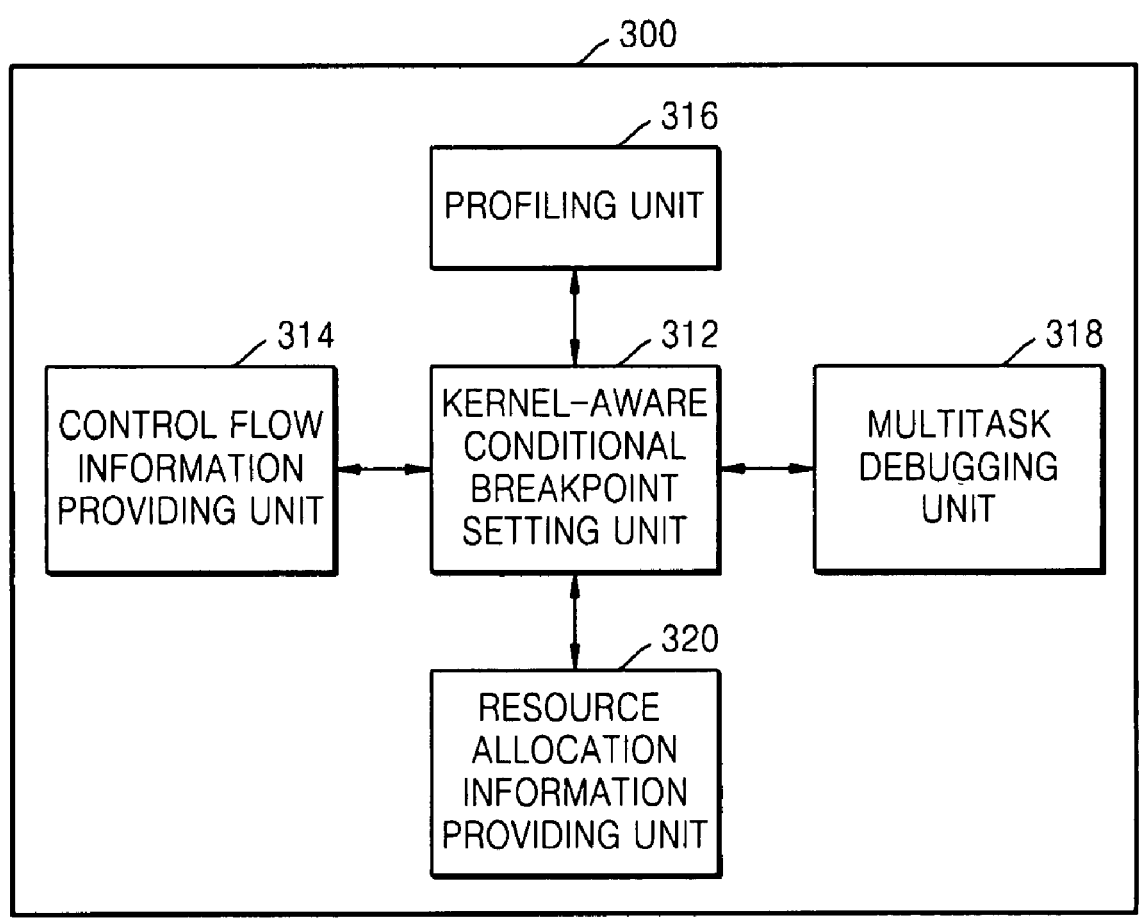
FIG. 3 illustrates a kernel-aware debugging interface of a debugging system, according to an embodiment of the present invention.

FIG. 3 illustrates a structure of a kernel-aware debugging interface 300 of a debugging system, according to an embodiment of the present invention. Referring to FIG. 3, the kernel-aware debugging interface 300 may include a kernel-aware conditional breakpoint setting unit 312 which can stop operations of a central processing unit (CPU) while a specific kernel object is operating at a specific position. In addition, the kernel-aware debugging interface 300 may further include a control flow information providing unit 314, a profiling unit 316, a multitask debugging unit 318, and a resource allocation information providing unit 320, which may provide advanced debugging capabilities in cooperation with the kernel-aware conditional breakpoint setting unit 312.

In this case, the term object refers to objects that perform processing such as a task, hardware interrupt, and software interrupt, e.g., timer, signal, etc., which are execution units of the kernel, and resource objects such as semaphore, mutual exclusion (mutex), message queue, device drivers, files, memory blocks, which are resources that may be allocated or created using each component in the kernel.

In response to an input debugging command, the kernel-aware conditional breakpoint setting unit 312 sets and releases a kernel-aware conditional breakpoint at a predetermined memory address or at a function of a predetermined processing object operated in a kernel of a target system. According to conventional conditional breakpoint setting techniques, a breakpoint is set at a position which satisfies a condition formed of variables and a logical operation (for example, a variable 1==a constant 1 and a variable 2<variable 3). Conversely, an embodiment of the present invention provides a capability of setting a kernel-aware conditional breakpoint by improving the conventional conditional breakpoint setting technique at least to the extent that it can recognize a structure of the kernel. In other words, when a condition that a specific task, a specific hardware interrupt handler, a specific software interrupt handler, e.g., a timer, signal, etc., or a specific kernel resource object, e.g., mutex, semaphore, etc., is operating at a specific position is satisfied, the kernel-aware conditional breakpoint is set to stop the execution of the CPU. The conditions for setting the breakpoint may include a plurality of objects, and the specific position refers to a specific memory address or a specific function. For example, a breakpoint may be set at a position where a task A performs a function B.

According to an embodiment of the present invention, a method of setting a breakpoint based on the identification (ID) of a task will now be described in greater detail. If a breakpoint is set at a specific position, which a user has defined and the CPU operation is actually stopped at this position, a current task ID is identified. The current task ID can be identified with reference to a pointer of a control block of the currently performed task. For example, with the Samsung Multiplatform Kernel (SMK) Micro a value of gpCurrentTask, which is a pointer variable of the task control block, can be read. Since the gpCurrentTask is in a form of 'Task *' that is a pointer of the task control block, the current task ID can be identified by reading a value of gpCurrentTask->uiID. When the current task is not to be debugged after identifying the ID of the current task, the kernel-aware breakpoint can be set by continuously operating the CPU.

Methods of setting a breakpoint at a specific interrupt handler function and recognizing an interrupt context may be categorized into the following two methods, depending on the architecture of a kernel. First, the method may use a common interrupt handler function, and a breakpoint can be set at an entry of the common interrupt handler function, and parameter information or a value of a register of the common interrupt handler function can be checked when the CPU operating is stopped. When the actual called interrupt handler function is determined, from the checking result, as not being debugged, the CPU can be continuously performed.

In the case of the above SMK Micro example, if a CommonHandler( ) function, that is, a common interrupt handler is called, the number of an occurring interrupt can be checked by identifying uiIRONum, which is a parameter of this function. Specifically, the breakpoint can be set at the entry of CommonHandler( ), whether the function is entered can be checked, and then information about the actual called interrupt number checked by identifying the parameter uiIRONum can be stored in an arbitrary memory address space. When the breakpoint is set at an exit of the function, the CPU operating will be stopped after returning from the CommonHandler( ) function, which means the performance of the corresponding interrupt handler function is complete. By removing the interrupt number stored in the memory address space, it is recognized that the performance of a specific interrupt handler is to be called and completed.

Second, the method may use information about each interrupt handler function stored in the interrupt vector table. In this case, a breakpoint is set at a specific position indicated by a particular entry of the interrupt vector table, and the CPU is monitored as to whether the breakpoint returns at the interrupt handler stored at this position.

At this time, the breakpoints are set at the entry and exit of a particular function and the control flow may be recognized. Specifically, the breakpoint is set at the entry of the function to be stopped, and when the CPU is stopped operating at the set breakpoint, the value of an LR register is read. After a breakpoint is set at a memory position, e.g., the exit of the function, the address of which is the value obtained by adding a constant to the value of the LR register, the CPU operates, and the CPU is stopped operating at the breakpoint, which means the control flow is recognized at the exit of the corresponding function.

In a manner similar to that described above, a kernel-aware conditional breakpoint can be set at a handler of a software interrupt, such as a timer and signal, which is an asynchronous execution unit and present inside the kernel. As described above, a breakpoint can be set at the point when handler functions of the timer and signal are called, and it can be recognized whether handlers of a specific timer and signal are operating by checking parameters of the function, the value of a variable, and value of a register. At this time, if necessary, whether a specific handler performs can be distinctly written in a particular memory address by modifying resource code of the kernel so that the kernel-aware debugging can be efficiently performed. Moreover, a breakpoint is set at the exit of the handler function, and the information about the software interrupt object written in the memory address is removed when the CPU is stopped operating.

According to the method described above, whether a particular task, a specific hardware interrupt, or the execution unit of a distinct asynchronous software interrupt performs can be recognized. There may be a preference among these three types of performance. For example, the asynchronous software interrupt execution unit may have the highest preference, the hardware interrupt may have the next higher preference, and the task may have the lowest preference. Therefore, in this example, when the kernel-aware debugger stops at a specific breakpoint, whether the asynchronous software interrupt execution unit is working can be checked, and otherwise the hardware interrupt handler is checked and finally the task is checked.

A method of setting a breakpoint by recognizing a specific kernel object will now be described below. When a called function is determined as a function desired to be debugged after checking its parameter information, the CPU is stopped operating. In the case of SemDestroy( ), SemGetValue( ), SemPost( ), etc., in the example SMK Micro, which are related to semaphore, a first parameter is a pointer for a Sem structure, which is a semaphore control block, thereby allowing the determination of which semaphore is being managed by the function. Thus, the CPU can be set to stop operating only when the semaphore is to be debugged.

The control flow information providing unit 314 sets kernel-aware conditional breakpoints in various execution and resource objects such as a task, a hardware interrupt, a software interrupt and does debugging, and therefore can obtain information about the control flow between the objects. The obtained control flow information may be output as a graph with respect to a time axis. First, objects inside the kernel may be output, and procedures for transmitting the CPU control flows between the objects may be displayed with respect to time. The display time may include the future as well as the past. For example, the control flow information at one minute before and at ten seconds later may be output. However, the time for the control flow information is not limited to that described above, and it may be set by considering the performance of a system or a demand of a user.

Here, the future control flow information means predictable changes among the changes in control flows that are to occur in the future. In the case of a timer, which is an asynchronous software interrupt, the future control flow information can be predicted with reference to expiration time information. For example, using information of a timer control block, it is predicted that a timer, which may be supposed to expire earliest, will be performed next. In the case of RTOS, which provides a priority based scheduling function, the future control flow can be predicted with reference to priority information about the task. For example, it may be predicted that a task with a second priority will be performed next.

The information about scheduled tasks can be obtained by setting a breakpoint in a context switch function and debugging. For example, ContextSwitch( ) as a context switch function of the example SMK Micro may be called, which means that the context is switched from a task indicated by Task *pCurrentTask, as a first parameter, to a task indicated by Task *pNewTask, as a second parameter. According to this method, a predetermined number of task IDs which have recently been performed and a tick count at a context switch time point can be output to a screen. A function to only stop a task which is supposed to be debugged by checking a pNewTask parameter value when ContextSwitch( ) is called can be implemented. This function has an advantage in that a breakpoint can be set at a start point where the context is switched to a specific task. In addition, by setting a write breakpoint at a state variable, e.g., uiState of the example SMK Micro, of a task control block, the time when the state of the task is changed can be detected. The state change time may be obtained by reading a value of a specific variable or a value of a register. In the case of the example SMK Micro, the state change time can be obtained by reading a value of a gudSystemTick variable.

Figure 4:
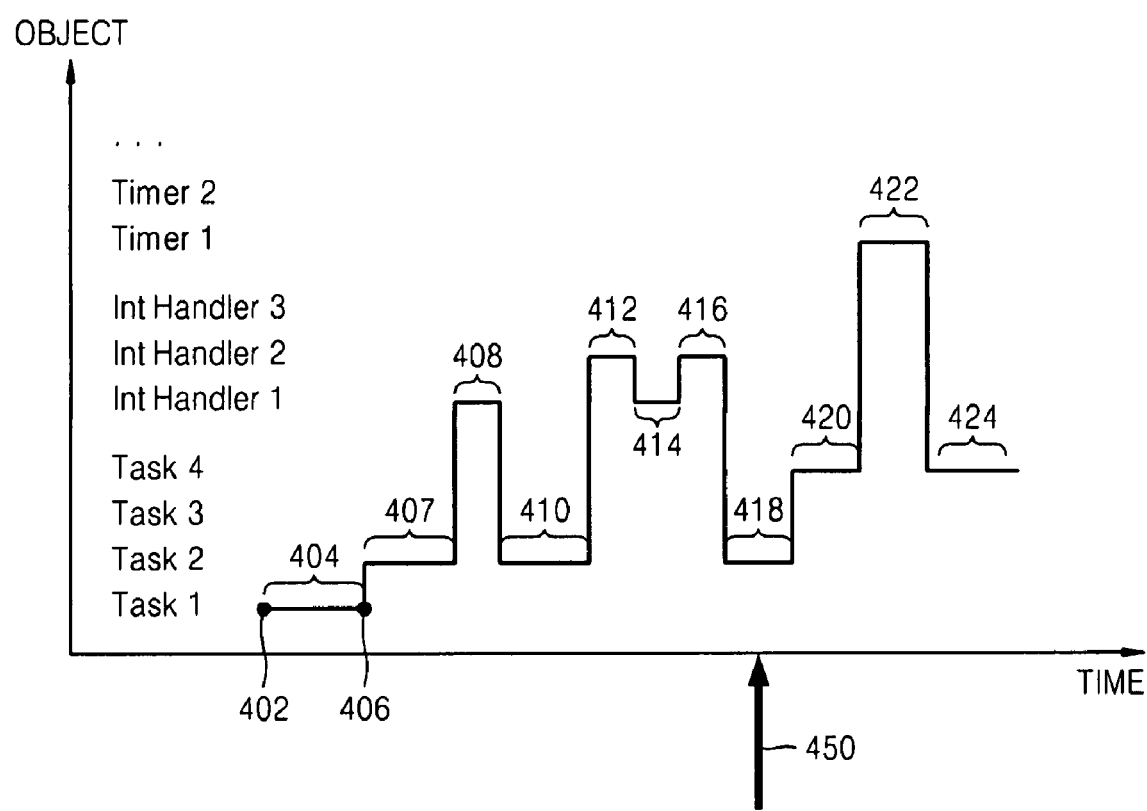
FIG. 4 illustrates a graph showing an example of control flow information, according to an embodiment of the present invention.

FIG. 4 illustrates a graph showing control flow information, according to an embodiment of the present invention. Referring to FIG. 4, a horizontal axis represents time, and each of a plurality of horizontal lines denotes a time difference 404 between a start time 402 and an end time 406 with reference to a system tick. A vertical axis represents execution and resource objects inside a kernel, and the past and future control flows are displayed based on the current time 450. Referring to FIG. 4, the control flow of a CPU proceeds in the order of a task 1 404, a task 2 407, an interrupt handler 1 408, the task 2 410, an interrupt handler 2 412, the interrupt handler 1 414, the interrupt handler 2 416, and the task 2 418. Further, the control flow can be predicted to flow in the order of a task 4 420, a timer 1 422, and the task 4 424.

The profiling unit 316 creates profile information by kernel-aware conditional breakpoints at the functions called in a target kernel through conditional breakpoint setting unit 312 and debugging. In this case, the profiling unit 316 may start to collect and store event occurrence information from the moment when a profiling start command is received, and stop storing the information when the profiling release command is received. The information collected by the profiling unit 316 may, thus, include call information of an application program interface (API) and an inner function of the kernel, hardware and software interrupt occurrence information, and context information when the event occurs. The API call information may include an API, which has been called at a particular system tick, and parameter information of the API. The interrupt occurrence information may include a reference number of the interrupt handler, the system tick where the interrupt occurs, and a program counter value before the interrupt occurs. Furthermore, contexts, that is, register values and local variables at the point when the two events occur can be profiled.

The collected information facilitates the detection of causes of faults when faults occur within a system, such as due to a kernel's call of a function or occurrence of an interrupt. In addition, this information is efficient for detecting the causes of faults such as temporarily occurring transit faults, which are difficult to debug. For example, if it is assumed that when a fault occurs, it may take at least one second, for example, for the fault to be displayed to a user. In this case, since changed processes of the control flow have been collected, it is up to back-tracing to figure out the point where the control flow has changed using the processes. Back-tracing allows the PC values to be changed into the values at the point where the control flow changed, and therefore the context at this point is recovered and checked. Specifically, a developer examines the source code and context at the point where the control flow changed and estimates the cause of the fault, and thus can identify the cause of the temporarily occurring fault easily.

Figure 5:
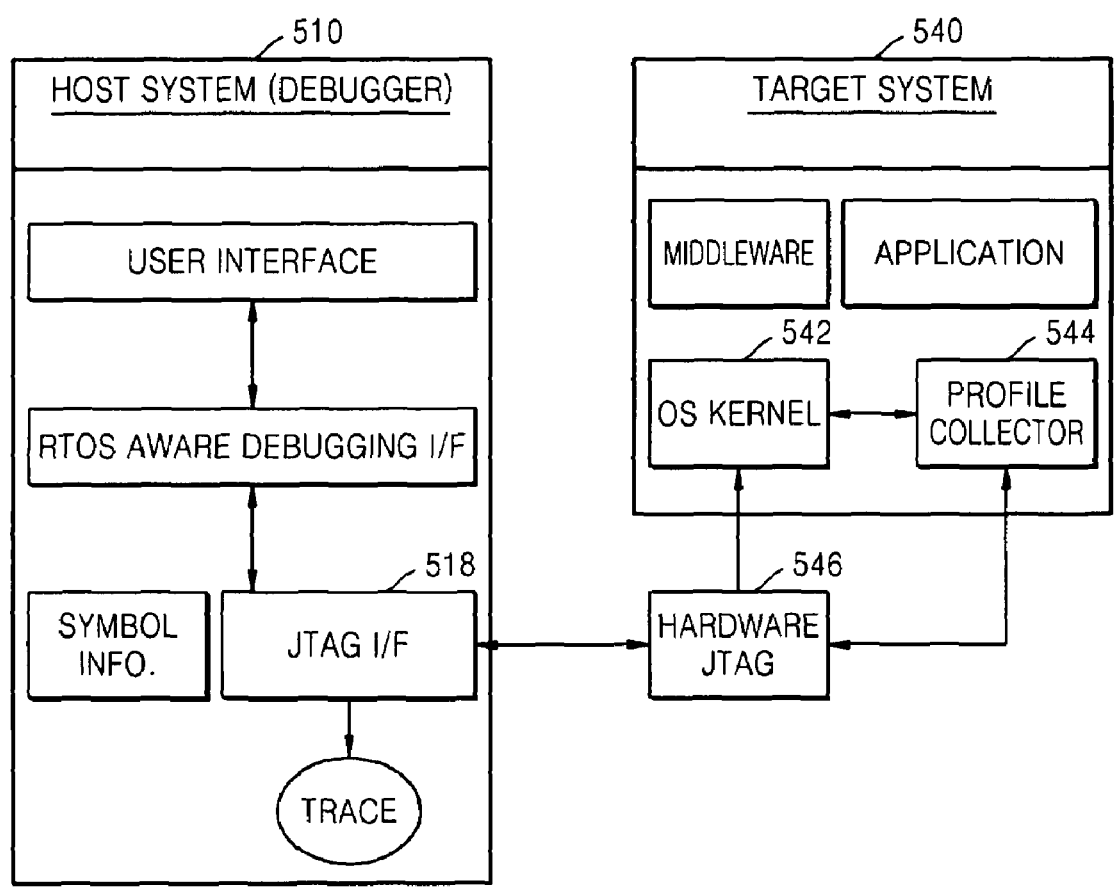
FIG. 5 illustrates architecture of a debugging system, which additionally includes a profiling capability, according to an embodiment of the present invention.

FIG. 5 illustrates architecture of a debugging system, which additionally includes a profiling capability, according to an embodiment of the present invention. Conventionally, a high-priced hardware tracking device, such as an embedded trace macrocell (ETM) device for an ARM processor, has been used, but such a tracking device can only profile about 3 to 10 second data because of its expense. Therefore, an embodiment of the present invention improves the tracing performance by combining a software debugging system and a low-priced hardware debugging system, such as a JTAG device, for example.

Referring to FIG. 5, the illustrated debugging system may include a host system 510 as a hardware debugger, including a JTAG interface 518, and a target system 540, which additionally may include a profile collecting module 544 communicating with a hardware JTAG module 546. The profile collecting module 544 in the target system 540 is a software module that acts as an agent, in order to ease an increasing additional expense problem that occurs when the hardware JTAG module 546 is used for precise profiling, and collects profiling information from a kernel. The profiling information collected by the profile collecting module 544 can be transferred to the JTAG interface 518 through the JTAG module 546, and thus the transfer time can be substantially reduced compared with the software debugging system.

When a CPU of the target system 540 stops operating at a kernel-aware conditional breakpoint, which may be set for a particular task using the aforementioned conditional breakpoint setting unit 312, the corresponding multi tasking debugging unit 318 makes a particular task enter into a waiting state, performs scheduling to make another task be performed, and then debugs the particular task.

When multi tasking is available, synchronization between tasks is important for both single processor and multi processor cases. When there is a fault or a malfunction related to the synchronization, it is necessary to represent the fault through debugging. The multi tasking debugging unit 318, thus, can perform debugging, such as setting a breakpoint, task by task so as to represent the fault, and normally perform another task which does not have any faults.

For multi task debugging, first, a breakpoint is set for a particular task. Information for debugging in case the CPU stops operating at this breakpoint is stored in a host system, the corresponding task enters a waiting state or a debugging state, and scheduling is performed. Then another task with a next priority is performed according to the scheduling. At this time, the debugging information of the task which stops at the current breakpoint can be output. When a single step command is performed in this state, a breakpoint is set at the next position, and the task enters a ready state to wait until it stops at the set breakpoint according to the scheduling. After this, the processes are repeated. If a task is selected and the function described above is performed on the task, the situation where various tasks access a common resource can be easily represented, which is efficient for detecting faults associated with the synchronization. This is especially useful for a multi-processor environment such as a multi-processor system-on-chip (MPSoC).

The multi task debugging procedures may be performed by debugger software recognizing a data structure of a kernel. This method has disadvantages in that various parts of a kernel should be recognized and overall system performance could deteriorate. Therefore, to avoid these disadvantages, a routine included in the kernel may change the state of a task into a waiting state automatically. In this case, when the control flow is moved to a particular function of the kernel, the state of a corresponding task is changed into a waiting state at this position and a scheduler starts to operate. Alternatively, a hardware debugger may be implemented in order to change the state of the task and operate the scheduler.

The aforementioned resource allocation information providing unit 320 may set kernel-aware conditional breakpoints for the task inside the target kernel and for the kernel objects using the conditional breakpoint setting unit 312 and perform debugging, thereby obtaining and outputting information of resources of the kernel and information of tasks related to the resources. More specifically, the resource allocation information providing unit 320 can arrange the resources requested by or distributed to the tasks, arrange each task which requests the resources or to which the resources are distributed to be perpendicular to the direction of the resources, and display the allocation information and the request information of the resources individually.

To this end, a breakpoint is set at an API, which requests the resource occupation or returns the resource, and when this API returns, the return value is checked. If the return value indicates that a function is successfully performed, that is, the corresponding resource is successfully occupied or returned, output resource allocation information is appropriately updated.

Figure 6:
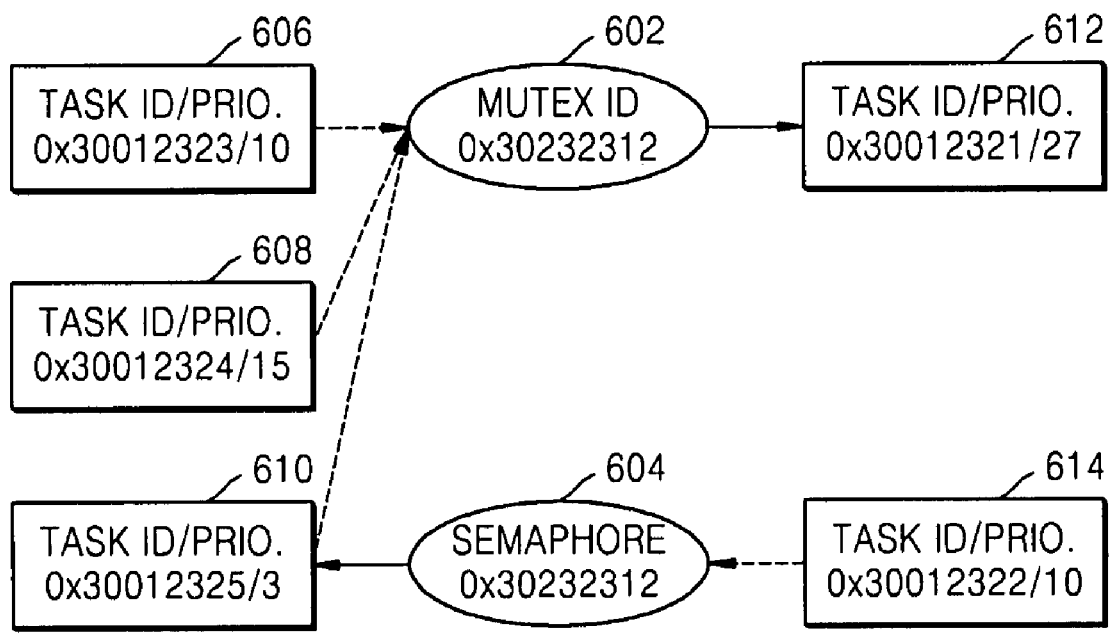
FIG. 6 illustrates an allocation of resources diagram, according to an embodiment of the present invention.

FIG. 6 is a diagram showing the allocation of resources, according to an embodiment of the present invention. Referring to FIG. 6, resources 602 and 604 distributed to a task are arranged vertically in the center, and the tasks 606, 608, 610, 612, and 614, related to the resources 602 and 604, are arranged horizontally. Solid arrows represent the allocation of resources, and dotted arrows represent the request of the resources. Here Mutex 0x30232312 is distributed to Task 0x30012321 612, and is requested by Task 0x30012323 606, Task 0x30012324 608, and Task 0x30012325 610. Semaphore 0x30232312 604 is distributed to Task 0x30012325 610, and is requested by Task 0x30012322 614.

FIG. 7A illustrates a method of setting a kernel-aware conditional breakpoint, according to an embodiment of the present invention. Referring to FIG. 7A, a breakpoint may be set at a predetermined location, e.g., a memory address or function, in operation 702. When a CPU stops operating at the set breakpoint, the currently operating object is checked, in operation 704. When the operating object is not to be debugged, the CPU proceeds to operate, in operation 706.

Figure 7B:
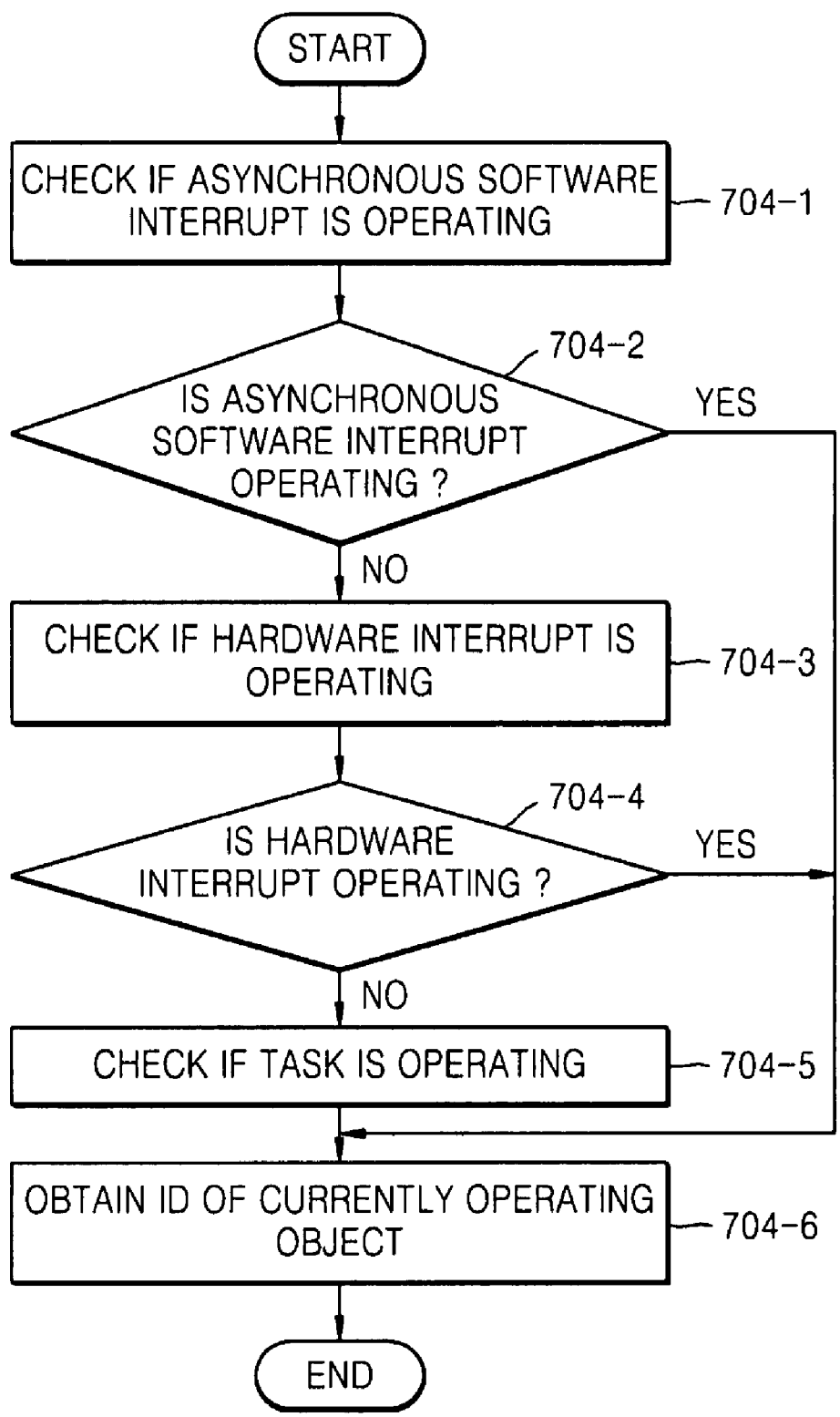
FIG. 7B illustrates a method of determining for which object the current context is operating according to the priorities of the kernel execution units, according to an embodiment of the present invention.

FIG. 7B illustrates a method of determining which object the current context is operating according to the priorities of the kernel execution units, according to an embodiment of the present invention. As described above, since the execution units of the kernel differ in their priorities according to type, whether execution is performed is checked starting from the execution unit of a type with a higher priority.

In FIG. 7B, the priority is set in the order of asynchronous software interrupt, hardware interrupt, and task, again noting that alternative embodiments are equally available. Whether the software interrupt is operating is checked, in operation 704-1. When the software interrupt is determined as not operating, operation 704-2, it is checked whether a hardware interrupt handler is operating at a corresponding location, in operation 704-3. When the hardware interrupt handler is determined as not operating, in operation 704-4, finally it is checked whether the task is operating at a corresponding location, in operation 704-5. A parameter, a register, or a variable of a function may further be checked in order to obtain an ID of the currently operating object, in operation 704-6.

Figure 8:
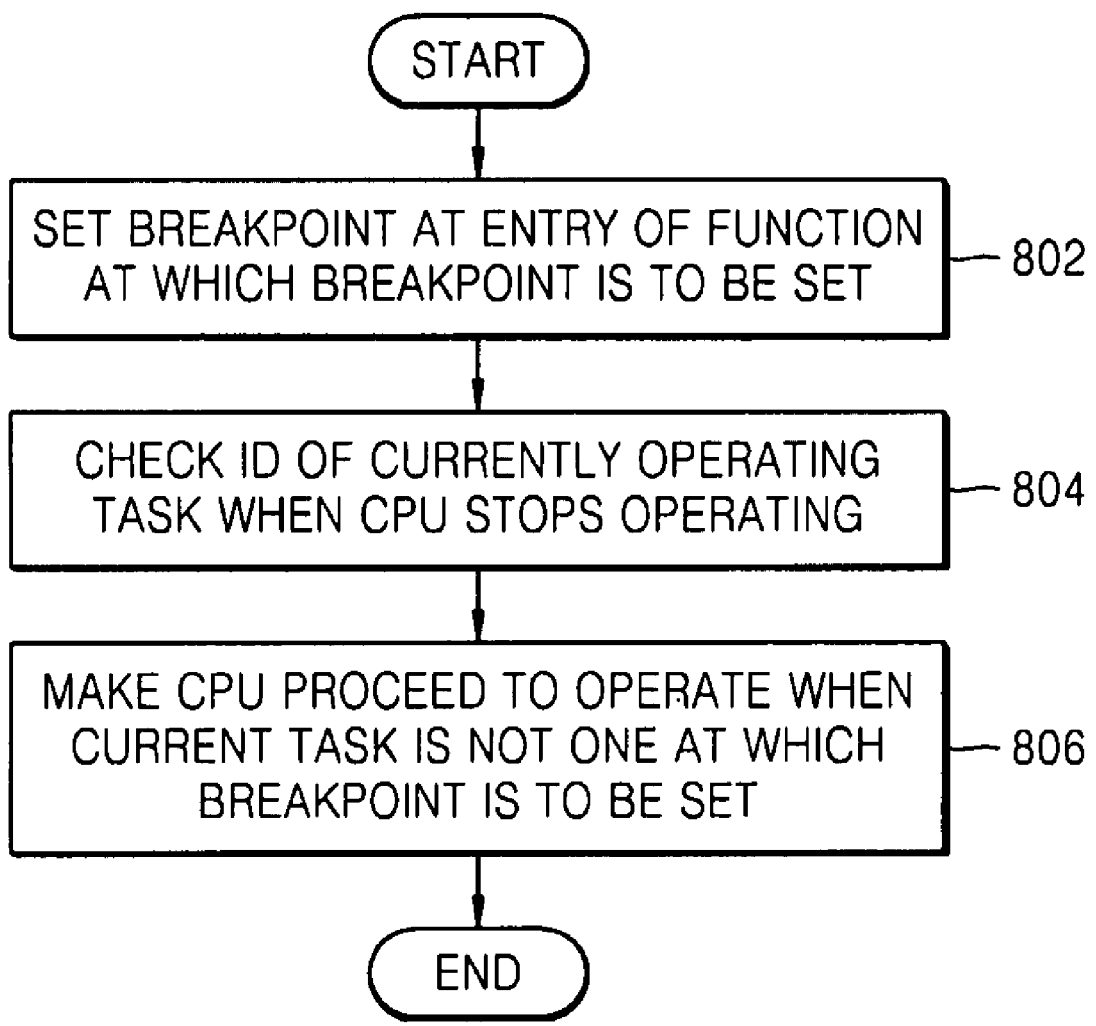
FIG. 8 illustrates a method of setting a breakpoint for a particular task, according to an embodiment of the present invention.
Figure 9:
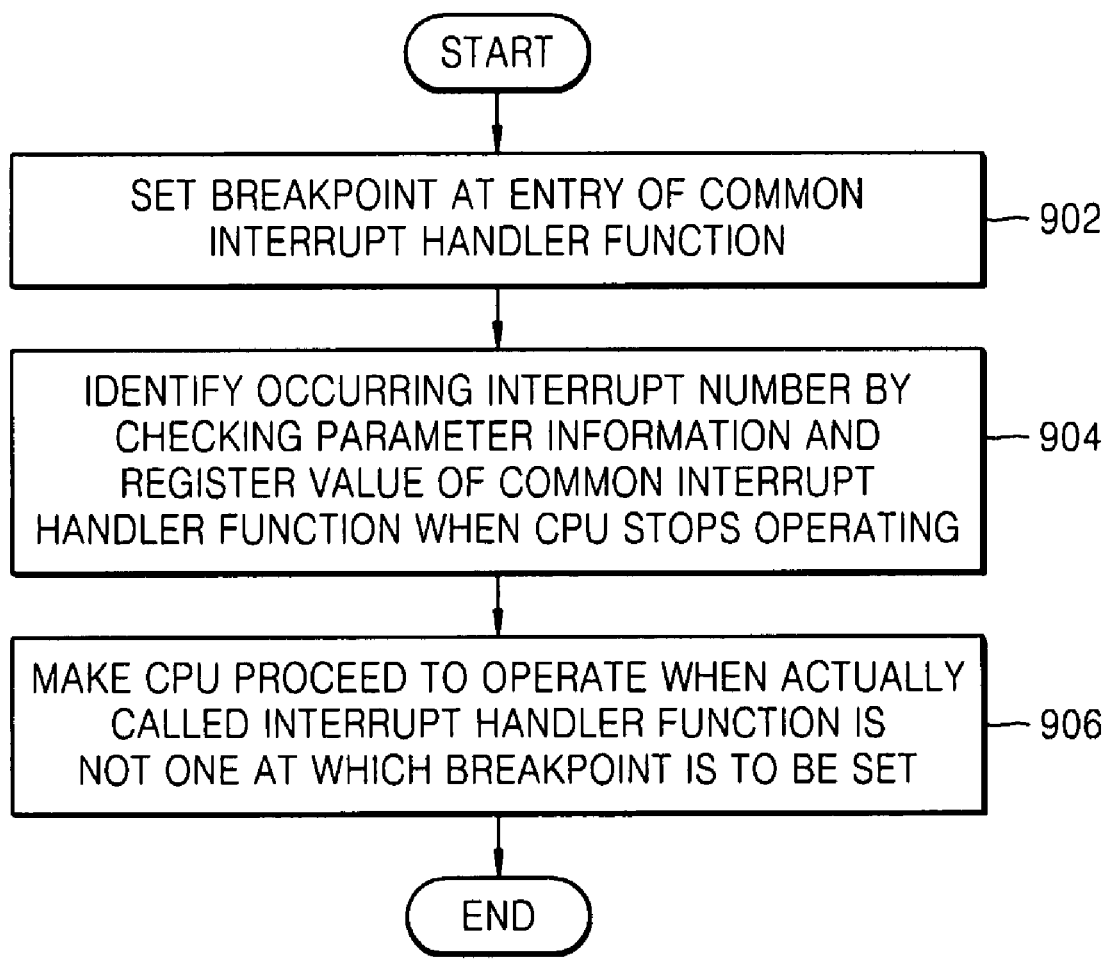
FIG. 9 illustrates a method of setting a breakpoint at a particular interrupt handler function, according to an embodiment of the present invention.
Figure 10:
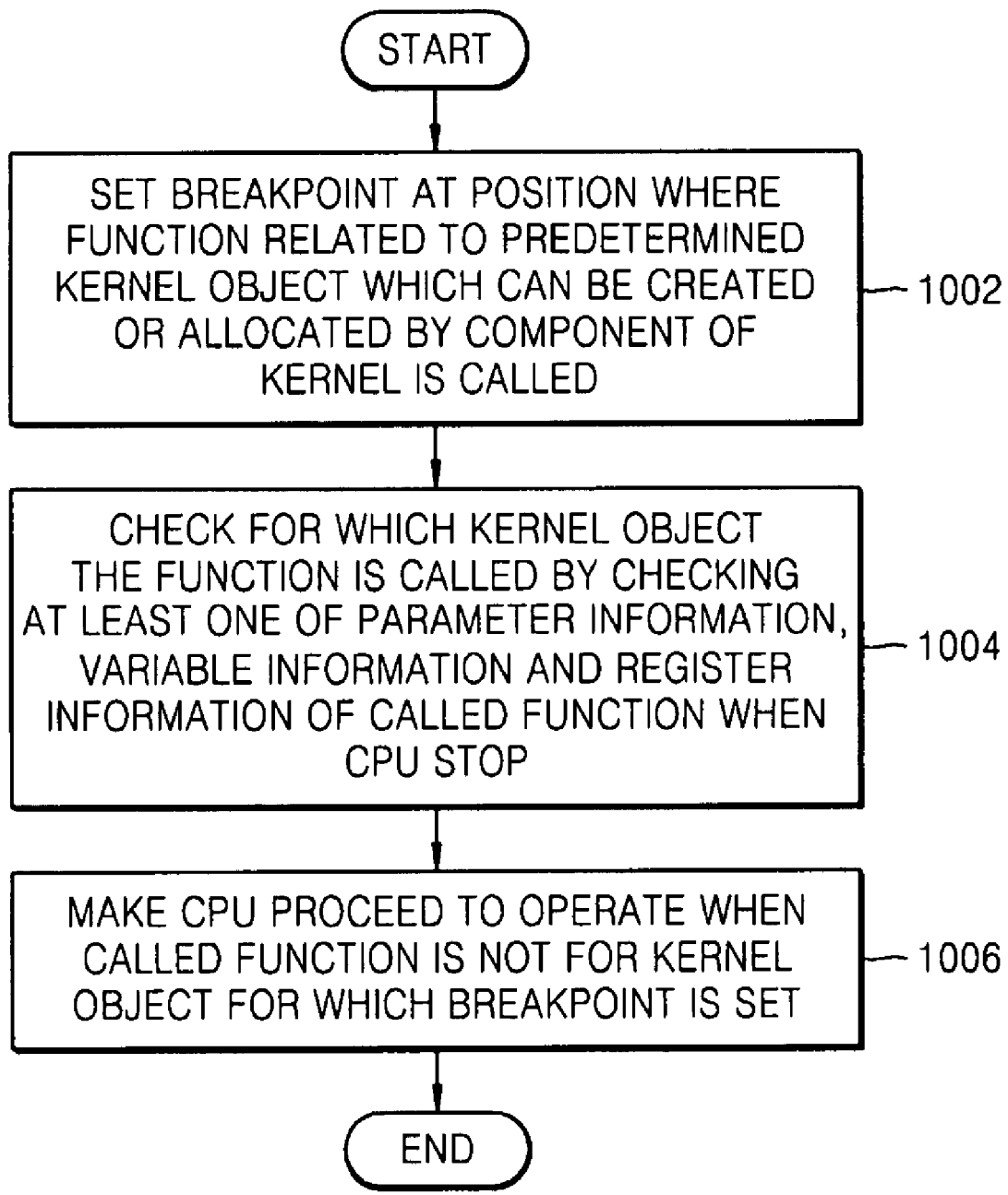
FIG. 10 illustrates a method of recognizing a particular kernel resource object, according to an embodiment of the present invention.

FIGS. 8 through 10 illustrate methods of setting a breakpoint for a particular task, a particular interrupt handler, and a particular kernel resource object, respectively, e.g., using the methods illustrated in FIGS. 7A and 7B.

FIG. 8 illustrates a method of setting a breakpoint for a particular task, according to an embodiment of the present invention. In FIG. 8, the breakpoint is set at a particular position where the particular task calls a particular function in response to a command.

Referring to FIG. 8, a breakpoint can be set at the entry of a function to be debugged, in operation 802. When a CPU of a target system stops operating at the set breakpoint, it can be determined which task is currently being performed by checking the current task ID, in operation 804. The current task ID may be obtained using information of a task control block, for example. When it is not intended that the task be debugged, the CPU may proceed to operate, in operation 806.

FIG. 9 illustrates a method of setting a breakpoint at a particular interrupt handler function, according to an embodiment of the present invention. In FIG. 9, the breakpoint is set at a particular position where the predetermined interrupt handler function is called in response to a command, and a common interrupt handler is used for an interrupt call.

Referring to FIG. 9, the breakpoint can be set at the entry of the common interrupt handler function, in operation 902. When the CPU of the target system stops operating at the set breakpoint, it can be determined which interrupt occurs by checking parameter information or register information of the common interrupt handler function, in operation 904. When it is determined that it is not intended that the actual called interrupt handler function be debugged, the CPU may proceed to operate, in operation 906.

FIG. 10 illustrates a method of recognizing a particular kernel resource object, according to an embodiment of the present invention. In FIG. 10, the breakpoint is set at a position where a function related to the predetermined kernel object is called in response to a command.

Referring to FIG. 10, the breakpoint may be set at a position where the function related to the predetermined kernel object, which can be created or allocated by a component of the kernel, is called, in operation 1002. When the CPU stops operating at the breakpoint, it can be determined for which kernel object the function is called by checking at least one of parameter information, variable information or register information of the called function, in operation 1004. When it is determined that the called function is not a function for the kernel object where it is intended that the breakpoint be set, the CPU proceeds to operate, in operation 1006.

Figure 11:
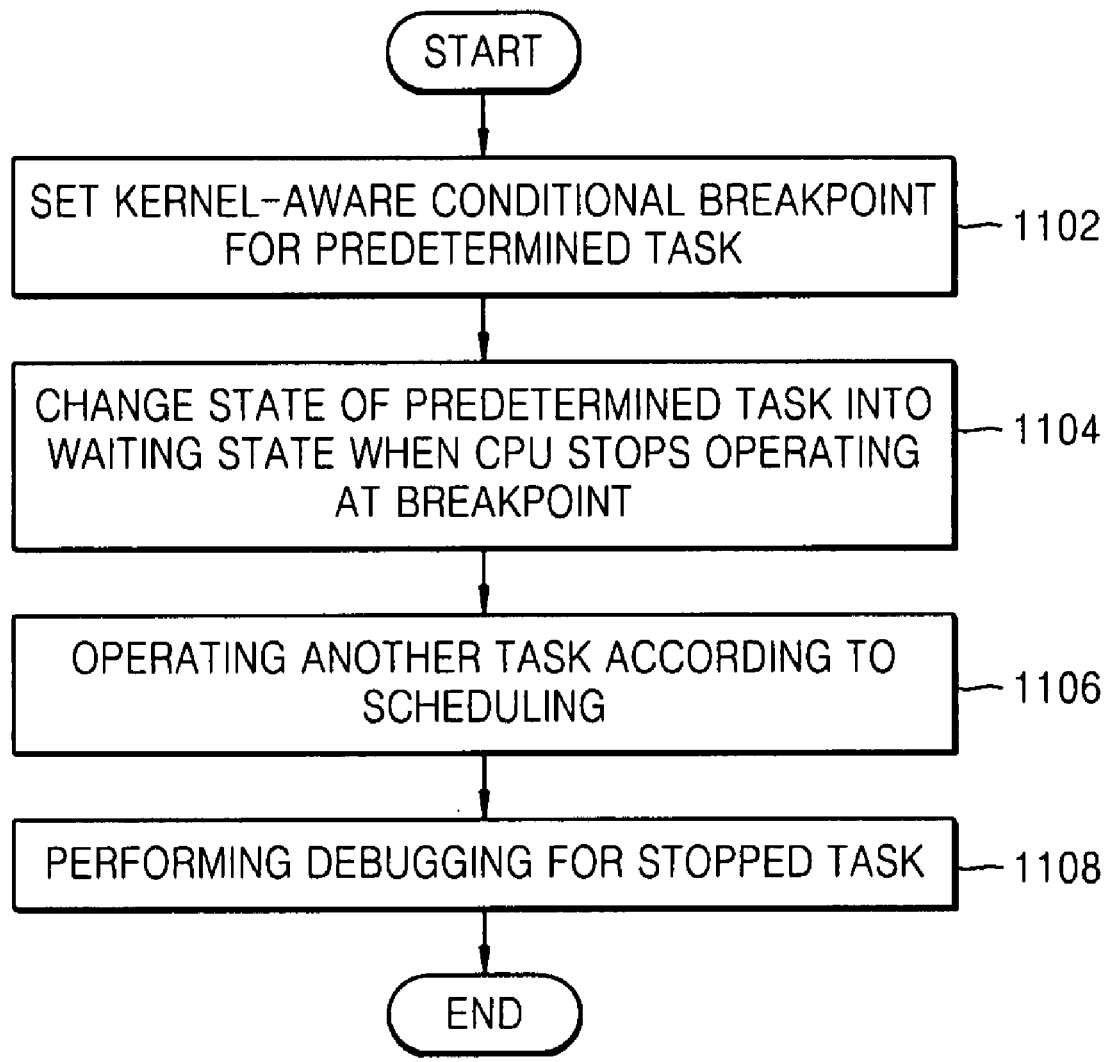
FIG. 11 illustrates a multitasking debugging method, according to an embodiment of the present invention.

FIG. 11 illustrates a multitasking debugging method, according to an embodiment of the present invention. Referring to FIG. 11, a kernel-aware conditional breakpoint may be set for a task to be debugged, such as by using the method illustrated in FIG. 7A, in operation 1102. When a CPU of a target system stops operating at the set breakpoint, the state of the corresponding task enters a waiting state, in operation 1104. Afterwards, scheduling is continuously performed, so that other tasks may be performed, operation 1106. Thereafter, debugging can be performed by operating the stopping task, step by step, in operation 1108.

For example, assuming that debugging is performed to detect a fault related to synchronization between task A and task B, which share a resource, first a breakpoint is set for the task A, and when the CPU stops operating at the breakpoint, debugging information is stored and the state of the task A enters a waiting state. Then, scheduling is performed, so that the task B with the lower priority is performed. At this time, when a single step command is executed, a breakpoint is set at the next position. After the state of the task A is changed into a ready state, scheduling is performed and the task A stops at the set breakpoint, and then debugging information is stored again. When the debugging information is obtained by performing the task A step by step, the situation where the task A and the task B access the common resource can be represented.

According to one or more embodiments of the present invention, advanced debugging capabilities such as kernel-aware conditional breakpoint setting, outputting of control flow information, profiling, multitask debugging, and resource allocation graph output are provided, and thus efficient debugging is possible. Moreover, a temporarily occurring transit fault can be easily detected and represented, and therefore stability can be secured which is very important in the course of software development.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A kernel-aware debugging system, comprising:
a kernel-aware debugging interface including a conditional breakpoint setting unit which sets a kernel-aware conditional breakpoint by checking a currently operating object inside a kernel of a target system when a central processing unit (CPU) of the target system stops operating at a particular position where the breakpoint is set and making the CPU proceed to operate when it is determined that the currently operating object is predetermined as being not intended to be debugged;
wherein the kernel debugging interface further includes a control flow information providing unit which sets kernel-aware debugging breakpoints in objects, which are performed inside the kernel of the target system, using the conditional breakpoint setting unit and performs debugging, thereby obtaining and outputting information on control flow of the CPU between the objects,
wherein the control flow information providing unit outputs predicted future control flow between the objects,
wherein the control flow information providing unit predicts the predicted future control flow with reference to expiration time information of a timer.

2. The kernel-aware debugging system of claim 1, wherein the conditional breakpoint setting unit checks sequentially whether an object belonging to an execution unit is operating according to defined priorities of execution units of the kernel.

3. The kernel-aware debugging system of claim 1, wherein the conditional breakpoint setting unit sets breakpoints at an entry and an exit of an interrupt handler function, which is registered in a hardware interrupt vector table, records a currently called interrupt number in a memory when the CPU stops operating at the entry of the interrupt handler function, and removes the interrupt number from the memory when the CPU stops operating at the exit of the interrupt handler function.

4. The kernel-aware debugging system of claim 3, wherein the conditional breakpoint setting unit identifies the interrupt number with reference to parameter information or register information of a common interrupt handler function when the interrupt handler function registered in the hardware interrupt vector table is the common interrupt handler function.

5. The kernel-aware debugging system of claim 1, wherein the conditional breakpoint setting unit sets breakpoints at an entry and an exit of a handler function which processes a software interrupt, records information about an actual called software interrupt object in a memory by checking at least one of parameter information variable information, and register information of the handler function when the CPU stops operating at the entry of the handler function, and removes the information from the memory when the CPU stops operating at the exit of the handler function.

6. The kernel-aware debugging system of claim 1, wherein the conditional breakpoint setting unit sets the breakpoint at a point a user indicates, and, when the CPU stops operating, checks a currently operating task 10 and makes the CPU proceed to operate if the task is determined as being not intended to be debugged.

7. The kernel-aware debugging system of claim 1, wherein the conditional breakpoint setting unit sets the breakpoint at a position where a function related to a predetermined kernel object, which is created or allocated by a component of the kernel, is called, and, when the CPU stops operating at the breakpoint, checks at least one of parameter information, variable information, and register information of a called kernel object related function and makes the CPU proceed to operate if the checked function is not related to the predetermined kernel object.

8. The kernel-aware debugging system of claim 1, wherein the control flow information providing unit predicts the predicted future control flow of tasks according to scheduling with reference to priority information of the tasks.

9. The kernel-aware debugging system of claim 1, wherein, when a context switch function is called, the control flow information providing unit determines that a context switch between tasks is performed, with the tasks being indicated by at least one of parameter information, variable information, and register information of the context switch function.

10. The kernel-aware debugging system of claim 1, wherein the control flow information providing unit examines for a state change of a task by setting a writing breakpoint at a state variable of a corresponding task control block and obtains information about a system time at which the state change occurs with reference to variable information or register information.

11. The kernel-aware debugging system of claim 1, wherein the kernel-aware debugging interface further includes a profiling unit which collects function call information of the kernel, interrupt occurrence information and context information at a time when events occur by setting a kernel-aware conditional breakpoint in functions which are called in the kernel of the target system and performing debugging using the conditional breakpoint setting unit.

12. The kernel-aware debugging system of claim 11, wherein the profiling unit back-traces to a past event occurrence position with reference to the collected profiling information.

13. The kernel-aware debugging system of claim 11, wherein the profiling unit is included in the target system as a software module and the kernel-aware debugging system further includes a JTAG (joint test action group) interface for receiving the information collected by the profiling unit through a hardware JTAG module of the target system.

14. The kernel-aware debugging system of claim 13, wherein the target system is a system physically separate from a host system comprising the kernel-aware debugging interface.

15. The kernel-aware debugging system of claim 1, wherein the kernel-aware debugging interface further includes a multitask debugging unit which changes a state of a predetermined task into a waiting state when the CPU stops operating at a kernel-aware conditional breakpoint which has been set at the predetermined task by the conditional breakpoint setting unit, reads a context of the task, makes another task operate by performing scheduling sequentially after the stopping at the set breakpoint, and then performs debugging using context information of the predetermined task.

16. The kernel-aware debugging system of claim 15, wherein the change into the waiting state and scheduling are performed by a routine included in software driven by the target system.

17. The kernel-aware debugging system of claim 15, wherein the change into the waiting state and scheduling are performed by a hardware debugger.

18. The kernel-aware debugging system of claim 1, wherein the kernel-aware debugging interface further includes a resource allocation information providing unit which sets kernel-aware conditional breakpoints for execution unit objects which operate inside the kernel and resource objects which are distributed or created by a component and further performs debugging using the conditional breakpoint setting unit, thereby obtaining and outputting information about at least one resource related to each of the execution unit objects.

19. The kernel-aware debugging system of claim 18, wherein the resource allocation information providing unit displays at least one resource and an execution unit object to which the resource has been allocated or which has requested the resource through a graphic user interface, and outputs a resource allocation graph separately showing allocation information and request information of the resource.

20. A debugging method, the method comprising:
setting a kernel-aware conditional breakpoint by checking a currently operating object inside a kernel of a target system when a central processing unit (CPU) of the target system stops operating at a position where the breakpoint has been set and making the CPU proceed to operate if the checked object is predetermined as being not intended to be debugged;
obtaining and outputting CPU control flow information between objects by setting breakpoints at objects operating inside the kernel of the target system and performing debugging when a command for outputting control flow information is input; and
outputting predicted future control flow between the objects operating inside the Kernel;
Wherein the outputting of the control flow information further includes predicting the predicted further control flow with reference to expiration time information of a timer.

21. The debugging method of claim 20, wherein the setting of the kernel-aware conditional breakpoint includes checking sequentially whether an object belonging to each execution unit is operating according to defined priorities of execution units of the kernel.

22. The debugging method of claim 20, wherein the setting of the kernel-aware conditional breakpoint further includes setting breakpoints at an entry and an exit of an interrupt handler function, registered in a hardware interrupt vector table, recording a number of a currently called interrupts in a memory when the CPU stops operating at the entry of the interrupt handler function, and removing the recorded number from the memory when the CPU stops operating at the exit of the interrupt handler function.

23. The debugging method of claim 20, wherein the recording of the interrupt number includes obtaining the interrupt number with reference to parameter information or register information of a common interrupt handler function when the interrupt handler function registered in the hardware interrupt vector table is the common interrupt handler function.

24. The debugging method of claim 20, wherein the setting of the kernel-aware conditional breakpoint further includes setting an entry and an exit of a handler function which processes a software interrupt, recording information about an actual called software interrupt object in a memory by checking at least one of parameter information, variable information, and register information of the handler function when the CPU stops operating at the entry of the handler function, and removing the information from the memory when the CPU stops operating at the exit of the handler function.

25. The debugging method of claim 20, wherein the setting of the kernel-aware conditional breakpoint further includes setting the breakpoint at a position a user indicates, and when the CPU stops operating, checking an identification (10) of a currently operating task and making the CPU proceed to operate when a determination is made that the checked task is not intended to be debugged.

26. The debugging method of claim 20, wherein the setting of the kernel-aware conditional breakpoint further includes setting the breakpoint at a position where a function related to a predetermined kernel object, which is created or allocated by a component of the kernel, is called, checking at least one of parameter information, variable information, and register information of a called kernel object related function when the CPU stops operating at the breakpoint, and making the CPU proceed to operate when the called function is not related to the predetermined kernel object.

27. The debugging method of claim 20, wherein the outputting of the control flow information further includes predicting the predicted future control flow according to scheduling with reference to priority information about tasks.

28. The debugging method of claim 20, wherein the outputting of the control flow information further includes determining that a context switch between tasks, which are indicated by at least one of information about parameter, variable, and register of a context switch function, is performed when the context switch function is called.

29. The debugging method of claim 20, wherein the outputting of the control flow information further includes setting a writing breakpoint at a state variable of a task control block, and, when the CPU of the target system stops at the writing breakpoint, determining that a state of a corresponding task is changed and obtaining information about a system time when the state is changed with reference to variable information or register information.

30. The debugging method of claim 20, further comprising: when a profiling command is input, profiling in which function call information, interrupt occurrence information, and context information of a kernel at the time, when corresponding events occur, are collected by setting kernel-aware conditional breakpoints for corresponding functions called by the kernel of the target system and performing debugging.

31. The debugging method of claim 30, wherein the profiling further includes back-tracing a past event occurrence position with reference to the collected profiling information when a back-tracing command is input.

32. The debugging method of claim 30, wherein the profiling is performed in a profile collecting software module of the target system and further includes receiving information collected by the profile collecting module by way of a hardware JTAG module of the target system.

33. The debugging method of claim 20, wherein, when a multitask debugging command is input, the debugging method further comprises:
   setting the kernel-aware conditional breakpoint for a predetermined task;
   changing a state of the predetermined task into a waiting state and reading context information of the task when the CPU stops at the set breakpoint;
   operating another task according to scheduling sequentially after the stopping at the set breakpoint; and
   performing debugging using the context information of the predetermined task.

34. The debugging method of claim 33, wherein the changing of the state and the scheduling are performed by a routine included in software driven by the target system.

35. The debugging method of claim 33, wherein the changing of the state and the scheduling are performed by a hardware debugger.

36. The debugging method of claim 20, further comprising: when a resource allocation information providing command is input, obtaining and outputting information about at least one resource related to each execution unit object by setting the kernel-aware conditional breakpoints for resource objects which have been allocated or created by the execution unit objects and a component which are operating in the kernel and performing debugging.

37. The debugging method of claim 36, wherein the outputting of the information further includes displaying the at least one resource and each of the execution unit objects to which at least one resource has been allocated or which has requested the resource through a graphic user interface, and outputting a resource allocation graph separately showing allocation information and request information about the resource.

38. At least one medium comprising computer readable code to control at least one processing element to implement the method of claim 20.

* * * * *

UNITED STATES PATENT AND TRADEMARK OFFICE
CERTIFICATE OF CORRECTION

PATENT NO. : 8,239,838 B2  
APPLICATION NO. : 11/797759  
DATED : August 7, 2012  
INVENTOR(S) : Keun-soo Yim et al.

Page 1 of 1

It is certified that error appears in the above-identified patent and that said Letters Patent is hereby corrected as shown below:

In the Claims  
Column 12; Line 23; In Claim 6, delete "10" and insert -- ID --, therefor.  
Column 12; Line 57; In Claim 11, delete "a" and insert -- the --, therefor.  
Column 13; Line 35; In Claim 19, delete "claim 18 ," and insert -- claim 18, --, therefor.  
Column 13; Line 56; In Claim 20, delete "Kernel;" and insert -- kernel, --, therefor.  
Column 13; Line 57; In Claim 20, delete "Wherein" and insert -- wherein --, therefor.  
Column 14; Line 29; In Claim 25, delete "(10)" and insert -- (ID) --, therefor.  
Column 14; Line 65; In Claim 30, delete "setting kernel" and insert -- setting the kernel --, therefor.

Signed and Sealed this  
Fourth Day of June, 2013

Teresa Stanek Rea  
*Acting Director of the United States Patent and Trademark Office*